(12) United States Patent
Chiang

(10) Patent No.: US 11,020,916 B2
(45) Date of Patent: Jun. 1, 2021

(54) OPTICAL FIBER CABLE AND METHOD FOR MANUFACTURING THE SAME

(71) Applicants: Gloriole Electroptic Technology Corp., Kaohsiung (TW); Haowave Cable (Shenzhen) Co., Ltd., Shenzhen (CN)

(72) Inventor: Pai-Hsiang Chiang, Shenzhen (CN)

(73) Assignees: Gloriole Electroptic Technology Corp., Kaohsiung (TW); Haowave Cable (Shenzhen) Co., Ltd., Shenzhen (CN)

(\*) Notice: Subject to any disclaimer, the term of this patent is extended or adjusted under 35 U.S.C. 154(b) by 0 days.

(21) Appl. No.: 16/734,875

(22) Filed: Jan. 6, 2020

(65) Prior Publication Data

US 2020/0262164 A1 Aug. 20, 2020

(30) Foreign Application Priority Data

Feb. 18, 2019 (TW) .................. 108105272

(51) Int. Cl.
*G02B 6/06* (2006.01)
*B29D 11/00* (2006.01)

(52) U.S. Cl.
CPC .......... *B29D 11/00701* (2013.01); *G02B 6/06* (2013.01)

(58) Field of Classification Search
CPC . B29D 11/00701; G02B 6/4479; G02B 6/448
See application file for complete search history.

(56) References Cited

U.S. PATENT DOCUMENTS

| | | | |
|---|---|---|---|
| 2014/0112631 A1* | 4/2014 | Namazue | G02B 6/44 385/114 |
| 2017/0219790 A1* | 8/2017 | Debban | B05D 1/02 |
| 2018/0149821 A1* | 5/2018 | Bringuier | G02B 6/4403 |

\* cited by examiner

*Primary Examiner* — Omar R Rojas
(74) *Attorney, Agent, or Firm* — Banner & Witcoff, Ltd.

(57) ABSTRACT

An optical fiber cable includes a plurality of optical fibers arranged in juxtaposition with one another, and a plurality of adhesive materials spaced-apart disposed on the optical fibers. Each of the adhesive materials binds adjacent ones of the optical fibers to one another in a number that is smaller than a total number of the optical fibers. A method for manufacturing the optical fiber cable includes arranging the optical fibers in juxtaposition with one another, and applying the adhesive materials to the optical fibers in a spaced-apart manner, such that each of the adhesive materials binds adjacent ones of the optical fibers.

5 Claims, 5 Drawing Sheets

OPTICAL FIBER CABLE AND METHOD FOR MANUFACTURING THE SAME

CROSS-REFERENCE TO RELATED APPLICATION

This application claims priority of Taiwanese Invention Patent Application No. 108105272, filed on Feb. 18, 2019.

FIELD

This disclosure relates to an optical fiber cable and a method for manufacturing the same.

BACKGROUND

A conventional optical fiber cable includes a plurality of optical fibers (e.g., 2, 4, 6, 8, 12, 24 or 36 optical fibers based on different applications) and a wrap wrapping around the optical fibers. Each of the optical fibers may have a unique color code so that a user can easily identify the optical fibers based on the color codes thereof and accurately connect the same to different ports of a device. In addition, to improve the accuracy of the connection, the optical fibers usually has a specific arrangement according to the color codes, for example, in an order of blue, orange, green, brown, grey, white, red, black, yellow, purple, pink, and blue-green for an optical fiber cable including 12 optical fibers. However, the optical fibers tend to get tangled with one another and lose the specific arrangement, which may cause trouble during installation and thus an increased error rate.

SUMMARY

Therefore, an object of the disclosure is to provide an optical fiber cable and a method for manufacturing the same that can alleviate at least one of the drawbacks of the prior art.

According to the disclosure, the optical fiber cable includes a plurality of optical fibers arranged in juxtaposition with one another, and a plurality of adhesive materials spaced-apart disposed on the optical fibers. Each of the adhesive materials binds adjacent ones of the optical fibers to one another in a number that is smaller than a total number of the optical fibers.

According to the disclosure, the method for manufacturing the optical fiber cable includes arranging a plurality of optical fibers in juxtaposition with one another, and applying a plurality of adhesive materials to the optical fibers in a spaced-apart manner, such that each of the adhesive materials binds adjacent ones of the optical fibers to one another in a number that is smaller than a total number of the optical fibers.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Figure 1:
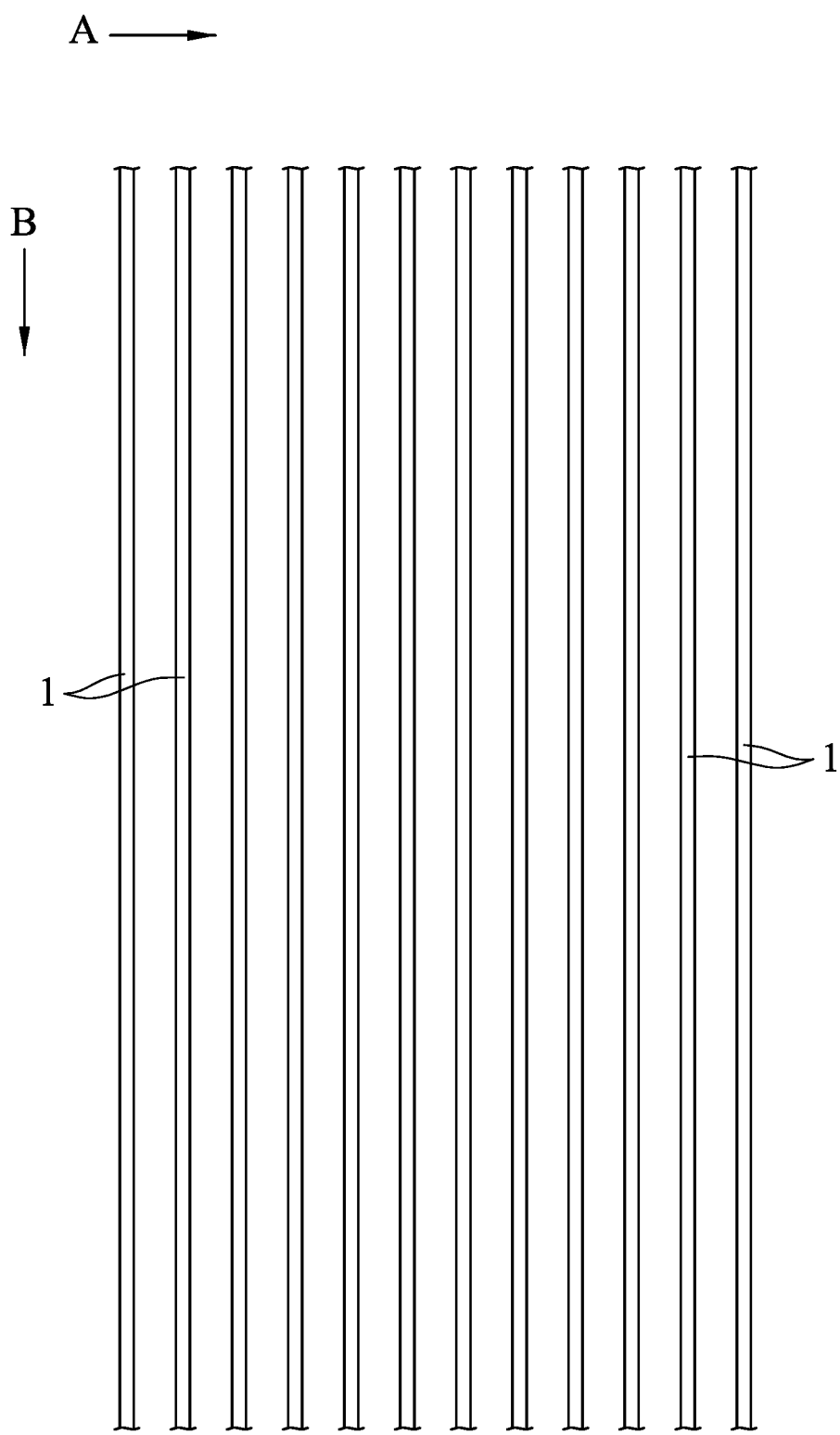
FIG. 1 is a fragmentary schematic top view illustrating an arranging step of an embodiment of a method for manufacturing an optical fiber cable according to the disclosure.

Before the disclosure is described in greater detail, it should be noted that where considered appropriate, reference numerals have been repeated among the figures to indicate corresponding or analogous elements, which may optionally have similar characteristics.

Figure 4:
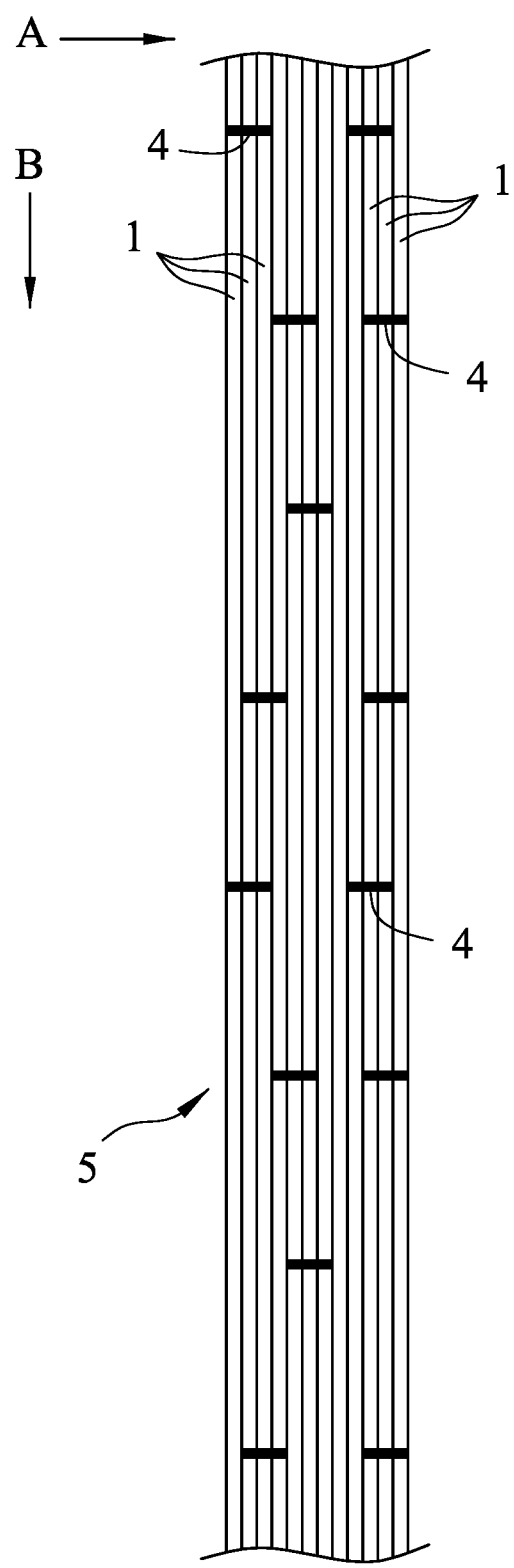
FIG. 4 is a fragmentary schematic top view illustrating an embodiment of an optical fiber cable made by the method according to the disclosure.

Referring to FIG. 4, an embodiment of an optical fiber cable 5 according to the disclosure includes a plurality of optical fibers 1 arranged in juxtaposition with one another, and a plurality of adhesive materials (e.g., epoxy) spaced-apart disposed on the optical fibers 1. Each of the adhesive materials 4 binds adjacent ones of the optical fibers 1 to one another in a number that is smaller than a total number of the optical fibers 1.

In certain embodiments, the optical fibers 1 are aligned in a first direction (A), and the adhesive materials 4 are spaced apart from one another in a second direction (B) that is transverse to the first direction (A). A portion of the adhesive materials 4 may also be spaced apart from one another in the first direction (A).

In this embodiment, the optical fiber cable 5 includes twelve optical fibers 1, and each of the adhesive materials 4 binds three adjacent ones of the optical fibers 1. It should be noted that, the number of the optical fibers 1 in the optical fiber cable 5, and the number (e.g., 2, 4 or 5) of the optical fibers 1 bound by each of the adhesive materials 4 are not limited to that disclosed in this embodiment, and may be varied according to practical requirements. Moreover, the distribution of the adhesive materials (such as the distance between two adjacent ones of the adhesive materials 4 and the total amount of the adhesive materials 4, etc.) may also be adjusted to achieve a desirable secured connection between the adhesive materials 4 and the optical fibers 1.

In certain embodiments, at least one of the optical fibers 1 bound by one of the adhesive materials 4 is different from those bound by another one of the adhesive materials 4. For example, one of the adhesive materials 4 may bind the first optical fiber 1 (i.e., the leftmost optical fiber 1 shown in FIG. 4) to the third optical fiber 1, and another one of the adhesive materials 4 may bind the second to the fourth optical fibers 1.

Figure 5:
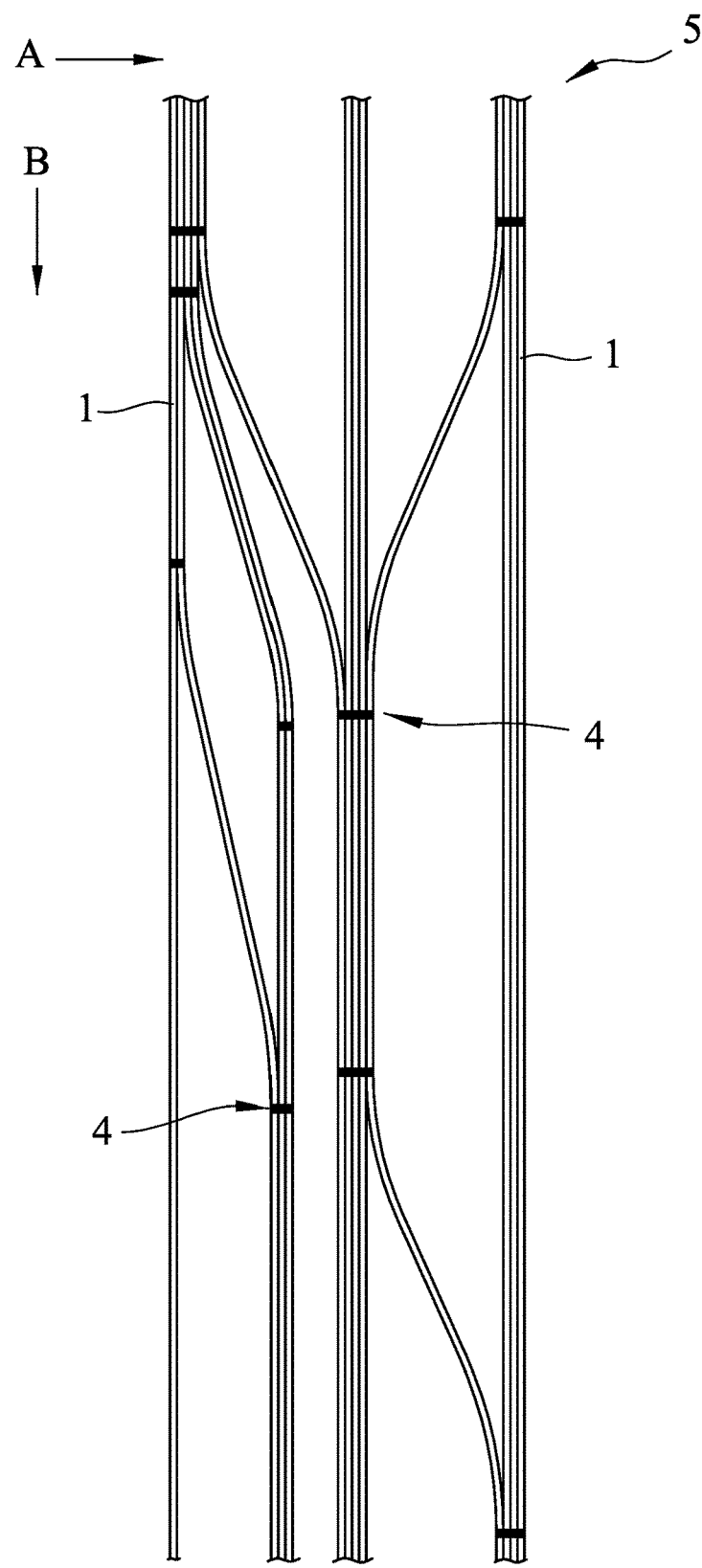
FIG. 5 is a fragmentary schematic top view illustrating a reticular structure of the optical fiber cable of the disclosure.

Referring to FIG. 5, when the optical fibers 1 not bound by the adhesive materials 4 are stretched in the first direction (A), a reticular structure can be observed due to separation of the optical fibers 1 from one another. As such, the optical fibers 1 can maintain the original arrangement such as according to their color codes without disturbing the alignment order thereof, while providing an excellent mobility thereamong. Therefore, a user can easily connect the optical fibers 1 to different ports of a device without the need to ascertain or adjust the arrangement, which may significantly reduce the installation time and the error rate.

Figure 6:
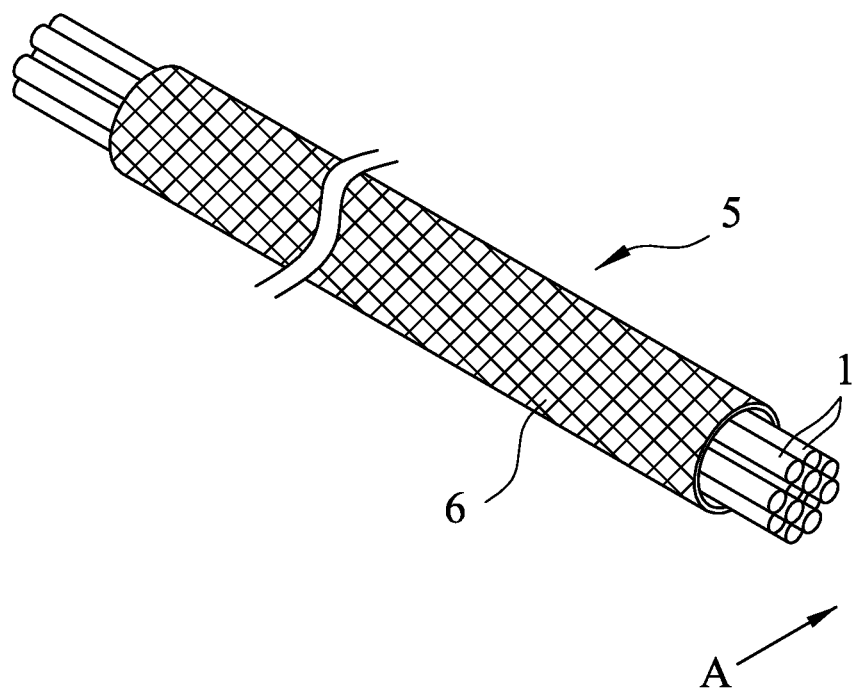
FIG. 6 is a fragmentary perspective view illustrating the optical fibers being wrapped by a wrap.

In addition, as shown in FIG. 6, the optical fiber cable 5 may further include a wrapper 6 that wraps around the optical fibers 1, which may assist in securing the arrangement of the optical fibers 1 based on their color codes and protect the optical fibers 1 from direct contact with heat and water so as to prevent damage thereto.

Figure 2:
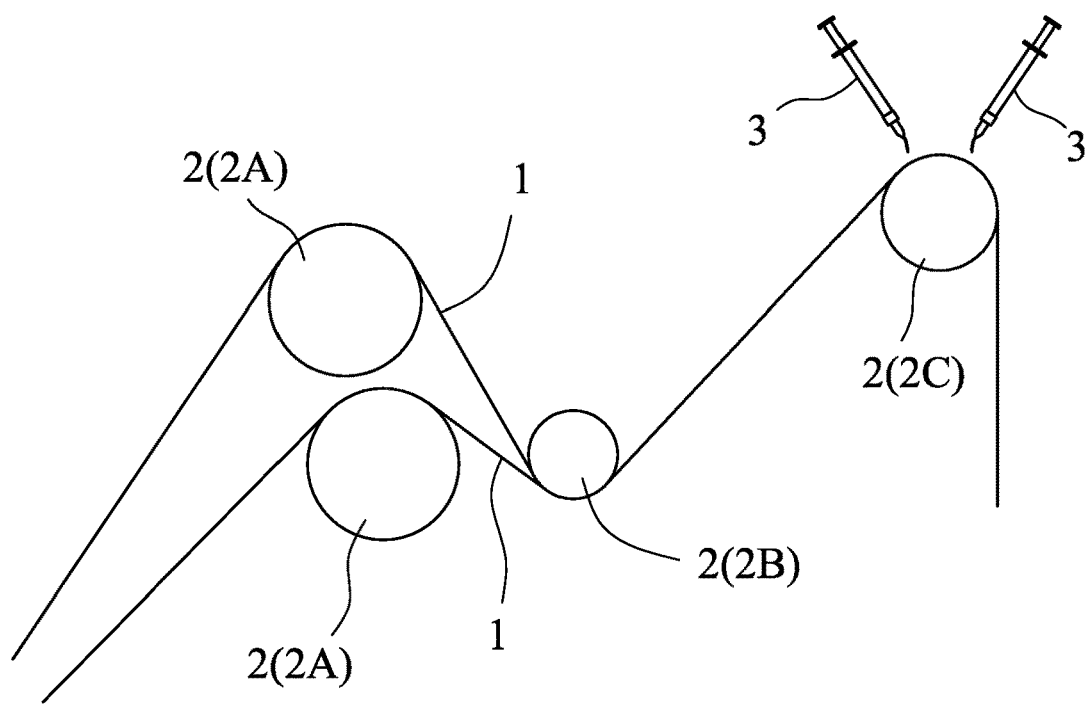
FIGS. 2 and 3 are schematic side and top views illustrating an applying step of the embodiment of the method for manufacturing the optical fiber cable according to the disclosure.
Figure 3:
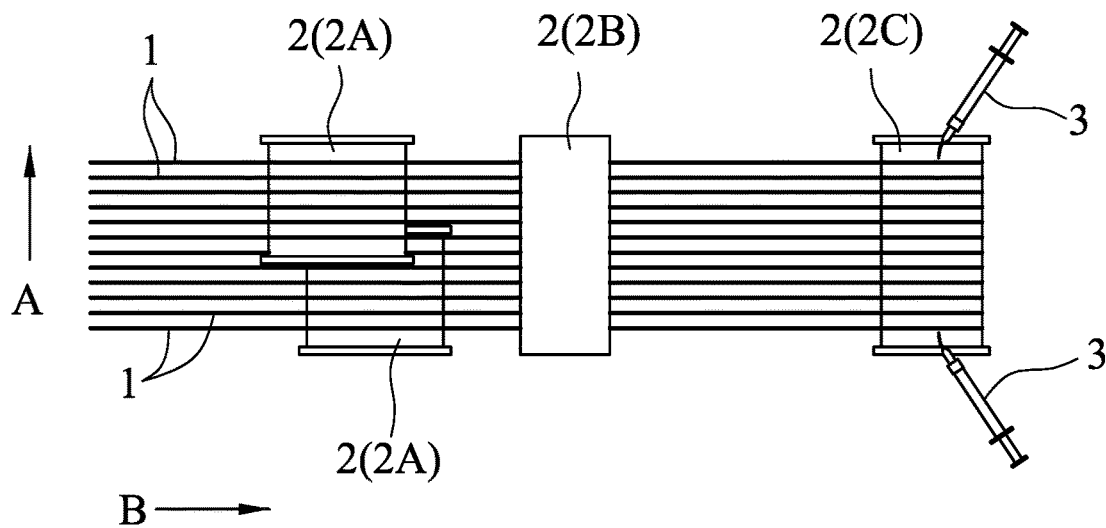

Referring to FIGS. 1 to 3, an embodiment of a method for manufacturing the abovementioned optical fiber cable 5 of the disclosure is provided and includes an arranging step and an applying step as described below.

In the arranging step, the optical fibers 1 are arranged in juxtaposition with each other. To be specific, the optical fibers 1, each of which may have a diameter of 250 µm, are aligned in the first direction (A) and in a predetermined order such as according to their color codes. Each of the optical fibers 1 may be colored with a different color on an outer peripheral surface thereof to indicate a corresponding color code.

It should be noted that the optical fibers 1 are illustrated to be spaced-apart from one another in FIGS. 1 to 3 for the sake of clarity. In fact, the optical fibers 1 are arranged to abut against one another in a radial direction, which is substantially parallel to the first direction (A). That is, the outer peripheral surfaces of adjacent ones of the optical fibers 1 are tangent to each other (see FIG. 4).

In this embodiment, twelve optical fibers 1 are wound on a plurality of cable reels 2 that are arranged in the second direction (B). Each of the cable reels 2 has a rotation axis that is parallel to the first direction (A).

The number of the cable reels 2 may be optimized based on the total number of the optical fibers 1 according to practical requirements and. In this embodiment, the optical fibers 1 are dividedly wound on two first cable reels 2A and converge at a second cable reel 2B downstream of the first cable reels 2A, and then are arranged in juxtaposition with one another at a third cable reel (2C) downstream of the second cable reel 2B.

In the applying step, the adhesive materials 4 are applied to the optical fibers 1 in a spaced-apart manner such that each of the adhesive materials 4 binds adjacent ones of the optical fibers 1.

In this embodiment, the adhesive materials 4 are applied to the optical fibers 1, e.g., by virtue of two dispensers 3 moving back and forth in the first direction (A). As such, the adhesive materials (4) may bind adjacent ones of the optical fibers 1 in the first direction (A), i.e., two of the adhesive materials 4 applied by the dispensers 3 at the same time may be spaced apart from each other in the first direction (A). In addition, since the rotation of the cable reels 2 also permits the optical fibers 1 to move back and forth in the second direction (B), the adhesive materials 4 sequentially applied on the optical fibers 1 are arranged spaced apart from one another in the second direction (B) (see FIG. 4).

It should be noted that, the distribution of the adhesive materials 4 as shown in FIG. 4 is merely for illustrative purpose. The manner of applying and distributing the adhesive materials 4 may be adjusted according to practical requirements. For example, the two dispensers 3 may apply the adhesive materials 4 respectively from the leftmost and rightmost ones of the optical fibers 1 to the next adjacent one or more optical fibers 1 to bind therewith. Afterwards, the dispensers 3, which are relatively moving in the second direction (B) due to the rotation of the cable reels 2, apply the adhesive materials 4 on the optical fibers 1 other than the leftmost and rightmost ones of the optical fibers 1. With such applying step, the optical fibers 1 are securely bound by the adhesive materials 4, so as to obtain the optical fiber cable 5.

In sum, with the spaced-apart adhesive materials 4 binding the optical fibers 1, the optical fiber cable 5 of this disclosure is capable of forming a reticular structure when stretched, indicating that the optical fibers 1 contained therein can maintain a specific arrangement in use, which may reduce the installation time and thus a reduced error rate.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment (s) but is intended to cover various arrangements included within the spirit and scope of the broadest interpretation so as to encompass all such modifications and equivalent arrangements.

What is claimed is:

1. A method for manufacturing an optical fiber cable, comprising:
    arranging a plurality of optical fibers in juxtaposition with one another; and
    applying a plurality of adhesive materials to the optical fibers in a spaced- apart manner, such that each of the adhesive materials binds adjacent ones of the optical fibers to one another in a number that is smaller than a total number of the optical fibers,
    wherein in the arranging step, the optical fibers are aligned in a first direction, and in the applying step, the optical fibers move back and forth in a second direction that is traverse to the first direction, and the adhesive materials are applied on the optical fibers in the first direction.

2. The method according to claim 1, wherein in the arranging step, twelve optical fibers are arranged, and in the applying step, each of the adhesive materials is applied to bind three adjacent ones of the optical fibers.

3. The method according to claim 2, wherein in the applying step, the adhesive materials are spaced apart from one another in the second direction.

4. The method according to claim 3, wherein in the applying step, a portion of the adhesive materials are spaced apart from one another in the first direction.

5. The method according to claim 1, wherein in the applying step, at least one of the optical fibers bound by one of the adhesive materials is different from those bound by another one of the adhesive materials.

* * * * *